United States Patent
Park et al.

(10) Patent No.: US 9,841,854 B2
(45) Date of Patent: Dec. 12, 2017

(54) DISPLAY DEVICE AND DRIVING METHOD THEREOF

(71) Applicant: Samsung Display Co., Ltd., Yongin, Gyeonggi-Do (KR)

(72) Inventors: Ji Hong Park, Suwon-si (KR); Moon Sung Choi, Incheon (KR); Sang Min Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 319 days.

(21) Appl. No.: 14/642,465

(22) Filed: Mar. 9, 2015

(65) Prior Publication Data
US 2016/0098116 A1    Apr. 7, 2016

(30) Foreign Application Priority Data
Oct. 1, 2014    (KR) .................. 10-2014-0132648

(51) Int. Cl.
*G06F 3/041* (2006.01)
*G06F 3/044* (2006.01)

(52) U.S. Cl.
CPC ............ *G06F 3/044* (2013.01); *G06F 3/0418* (2013.01)

(58) Field of Classification Search
CPC .... G06F 3/044; G06F 3/03545; G06F 3/0412; G06F 3/0416
USPC ................................................. 345/173, 174
See application file for complete search history.

(56) References Cited

U.S. PATENT DOCUMENTS

| | | |
|---|---|---|
| 8,203,536 B2 | 6/2012 | Ito |
| 8,542,208 B2 | 9/2013 | Krah et al. |
| 2011/0058293 A1* | 3/2011 | Pardoen ............ H01L 27/0251 361/56 |
| 2011/0061947 A1 | 3/2011 | Krah et al. |
| 2012/0062482 A1 | 3/2012 | Ding et al. |
| 2013/0141348 A1 | 6/2013 | Jamshidi-Roudbari et al. |
| 2013/0176273 A1 | 7/2013 | Li et al. |
| 2013/0176274 A1* | 7/2013 | Sobel ................. G06F 3/0416 345/174 |
| 2015/0161954 A1* | 6/2015 | Tokita ................ G06F 3/0412 345/174 |

FOREIGN PATENT DOCUMENTS

| | | |
|---|---|---|
| JP | 2009-252235 | 10/2009 |
| KR | 10-2009-0071387 | 7/2009 |
| KR | 10-2012-0096235 | 8/2012 |
| KR | 10-2013-0004658 | 1/2013 |
| KR | 10-2013-0078068 | 7/2013 |
| KR | 10-2014-0021222 | 2/2014 |

* cited by examiner

*Primary Examiner* — Calvin C Ma
(74) *Attorney, Agent, or Firm* — Innovation Counsel LLP

(57) ABSTRACT

A display device according to the present inventive concept includes: a display panel comprising a pixel electrode receiving a data voltage and a common electrode receiving a common voltage; and a touch sensor comprising a plurality of driving electrodes and a plurality of sensing electrodes, wherein the touch sensor applies a touch detection signal to the plurality of driving electrode and detects a touch location by receiving a sense signal from the plurality of sensing electrode in an active mode, and determines whether a touch is made by receiving sense signals of the plurality of sensing electrodes, that are fluctuated by a ripple of a common voltage applied to the common electrode according to driving of the display panel in an idle mode.

20 Claims, 13 Drawing Sheets

DISPLAY DEVICE AND DRIVING METHOD THEREOF

CROSS-REFERENCE TO RELATED APPLICATION

This application claims priority to and the benefit of Korean Patent Application No. 10-2014-0132648 filed in the Korean Intellectual Property Office on Oct. 1, 2014, the entire contents of which are incorporated herein by reference.

BACKGROUND (a) Field

Embodiments of the present inventive concept relates to a display device and a driving method thereof. More particularly, the present inventive concept relates to a display device including a touch sensor, and a method for driving the same.

(b) Description of the Related Art

A display device such as a liquid crystal display (LCD), an organic light emitting diode display, and the like includes a plurality of gate lines and a plurality of data lines connected to a plurality of pixels. The plurality of pixels are formed at crossing points of the gate lines and the data lines. When a scan signal of a gate-on voltage is sequentially applied to the plurality of gate lines, a data signal is applied to the plurality of data lines corresponding to the gate signal of the gate-on voltage such that image data is written to the plurality of pixels.

A touch sensor inputs a user's command by recognizing a touch location of the user. The touch sensor is provided in a front surface of a display panel or embedded in the display panel to recognize a location where a finger or an object touches to thereby determine an input signal. In general, a capacitive touch sensor is mainly used. The capacitive touch sensor senses variation of capacitance formed between an electrode and a conductive object such as a finger depending on whether a touch is made, and senses variation of the capacitance at the touch location by sequentially applying a touch detection signal for touch detection to a plurality of sense lines.

In general, when no touch operation is performed, the touch sensor operates in an idle mode, which is a touch input standby state, and is switched to an active mode when a touch is sensed to sense a touch location. In the idle mode, the touch sensor determines whether a touch is made by periodically outputting the touch detection signal to the plurality of sense lines.

Substantially, the touch sensor operates in the idle mode for a longer period of time than operating in the active mode while the display device is being used. However, the touch sensor periodically outputs the touch detection signal in the idle mode, thereby consuming unnecessary power.

The above information disclosed in this Background section is only for enhancement of understanding of the background of the inventive concept and therefore it may contain information that does not form the prior art.

SUMMARY

The present inventive concept has been made in an effort to provide a display device that can reduce unnecessary power consumption of a touch sensor, and a method for driving the same.

A display device according to an exemplary embodiment of the present inventive concept includes: a display panel comprising a pixel electrode receiving a data voltage and a common electrode receiving a common voltage; and a touch sensor comprising a plurality of driving electrodes and a plurality of sensing electrodes, wherein the touch sensor applies a touch detection signal to the plurality of driving electrode and detects a touch location by receiving a sense signal from the plurality of sensing electrode in an active mode, and determines whether a touch is made by receiving sense signals of the plurality of sensing electrodes, that are fluctuated by a ripple of a common voltage applied to the common electrode according to driving of the display panel in an idle mode.

The display panel is driven with an inversion driving method in which a polarity of the data voltage is inverted from a positive value to a negative value with reference to the common voltage, and the common voltage is fluctuated according to the inversion of the data voltage.

The display device may further include an electrostatic discharge prevention layer provided at an outer surface of the display panel, wherein a voltage of the electrostatic discharge prevention layer may be fluctuated due to coupling with the common electrode.

The sense signals of the plurality of sensing electrodes may be fluctuated due to coupling with the electrostatic discharge prevention layer.

The touch sensor may generate an active mode look-up table (LUT) by receiving sense signals from the plurality of sensing electrodes for one frame during which a touch detection signal is applied to the plurality of driving electrodes in the active mode.

The touch sensor may generate the active mode LUT and then determines whether a touch is made by comparing a sense signal that corresponds to the touch detection signal applied to the plurality of driving electrodes with the active mode LUT.

The touch sensor may determine that no touch is made when the sense signal that corresponds to the touch detection signal equals a value recorded in the active mode LUT, and may determine that a touch is made when a sense signal corresponding to the touch detection signal does not equal a value recorded in the active mode LUT.

When determining that a touch is made, the touch sensor may detect a spot indicating a value that is different from values recorded in the active mode LUT as a touch location.

When the touch sensor determines that no touch is made, the touch sensor may start the idle mode and stop outputting the touch detection signal.

The touch sensor may generate an idle mode LUT by receiving sense signals of the plurality of sensing electrodes that are fluctuated by a ripple of a common voltage generated for one frame of the display panel.

The touch sensor may determine whether a touch is made by comparing the sense signals of the plurality of sensing electrodes that are fluctuated by a ripple of the common voltage with the idle mode LUT for the next frame of the display panel.

When the touch sensor determines that no touch is made, the touch sensor may iteratively generate the idle mode LUT and determine whether a touch is made by comparing the sense signals of the plurality of sensing electrodes with the idle mode LUT.

When determining that a touch is made, the touch sensor may be driven in the active mode.

According to another exemplary embodiment of the present inventive concept, a method for driving a display device including a pixel electrode receiving a data voltage, a common electrode receiving a common voltage, a plurality of driving electrodes, and a plurality of sensing electrodes is provided. The method includes: generating sense signals from the plurality of sensing electrodes for one frame during which a touch detection signal is applied to the plurality of driving electrodes; storing the sense signals to an active mode look-up table (LUT); and comparing sense signals of one frame with the sense signals stored in an active mode LUT to determine whether a touch is made and stopping outputting the touch detection signal when it is determined that no touch is made.

The method may further include detecting capacitance variation of the plurality of sensing electrode to determine whether a touch is made during one frame while no touch detection signal is applied to the plurality of driving electrodes and storing sense signals to an idle mode LUT when it is determined that no touch is made.

The method may further include determining whether a touch is made by comparing sense signals of the plurality of sensing electrodes for one frame with the idle mode LUT.

The method may further include:

When it is determined that no touch is made, the detecting capacitance variation of the plurality of sensing electrode to determine whether a touch is made is performed.

When it is determined that a touch is made, the method is re-performed from the generating sense signals from the plurality of sensing electrodes for one frame during which a touch detection signal is applied to the plurality of driving electrodes.

When it is determined that touch is made, determining a spot indicating a value that is different from values recorded in the active mode LUT as a touch location.

The method may further include: applying the data voltage after inverting a polarity of the data voltage from a positive value to a negative value with reference to the common voltage, and generating a ripple of the common voltage according to the inversion of the data voltage.

The method may further include providing an electrostatic discharge prevention layer between the common electrode and the plurality of sensing electrodes, wherein a voltage of the electrostatic discharge prevention layer is fluctuated due to coupling with the common electrode.

The sense signals of the plurality of sensing electrodes may be fluctuated due to coupling with the electrostatic discharge prevention layer.

According to the exemplary embodiments of the present inventive concept, the touch sensor does not output a touch detection signal in an idle mode, thereby reducing unnecessary power consumption.

In addition, a driving signal of the display panel, which may cause a noise of the touch sensor, is used as a touch detection signal thereby reducing malfunctioning of the touch sensor caused by the driving signal of the display panel.

DETAILED DESCRIPTION OF THE EMBODIMENTS

Figure 1:
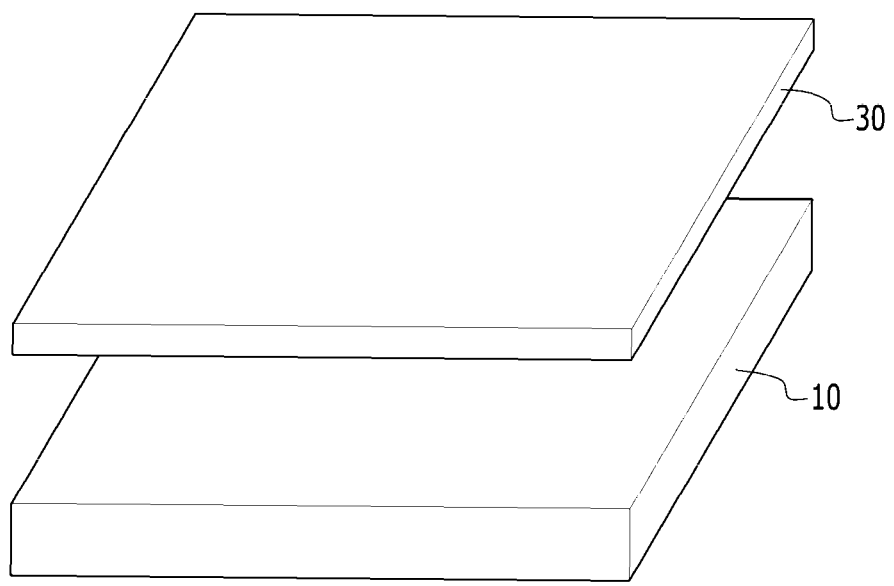
FIG. 1 is a schematic perspective view of a display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Further, in the exemplary embodiments, since like reference numerals designate like elements having the same configuration, a first exemplary embodiment is representatively described, and in other exemplary embodiments, only different configurations from the first exemplary embodiment will be described.

Accordingly, the drawings and description are to be regarded as illustrative in nature and not restrictive. Like reference numerals designate like elements throughout the specification.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present between the element and the other element. In contrast, when an element is referred to as being "directly on" another element, there are no intervening elements present. Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a schematic perspective view of a display device according to an exemplary embodiment of the present inventive concept.

Referring to FIG. 1, a display device includes a display panel 10 and a touch sensor 30 disposed on the display panel 10. An adhesive layer (not shown) is provided between the display panel 10 and the touch sensor 30 to bond the display panel 10 and the touch sensor 30 together. As the adhesive layer, an optical clear adhesive (OCA) may be used.

The display panel 10 includes a plurality of display elements. The display elements may be one of display elements of an organic light emitting diode (OLED) display, a liquid crystal display (LCD), a field emission display (FED), and a plasma display panel (PDP). That is, the display panel 10 may be one of the OLED display, the LCD, the FED, and the PDP.

The touch sensor 30 may be implemented as a capacitive touch sensor.

Hereinafter, the display panel 10 will be exemplarily described as a display panel of an LCD, and the touch sensor 30 will be exemplarily described as a capacitive touch sensor.

Figure 2:
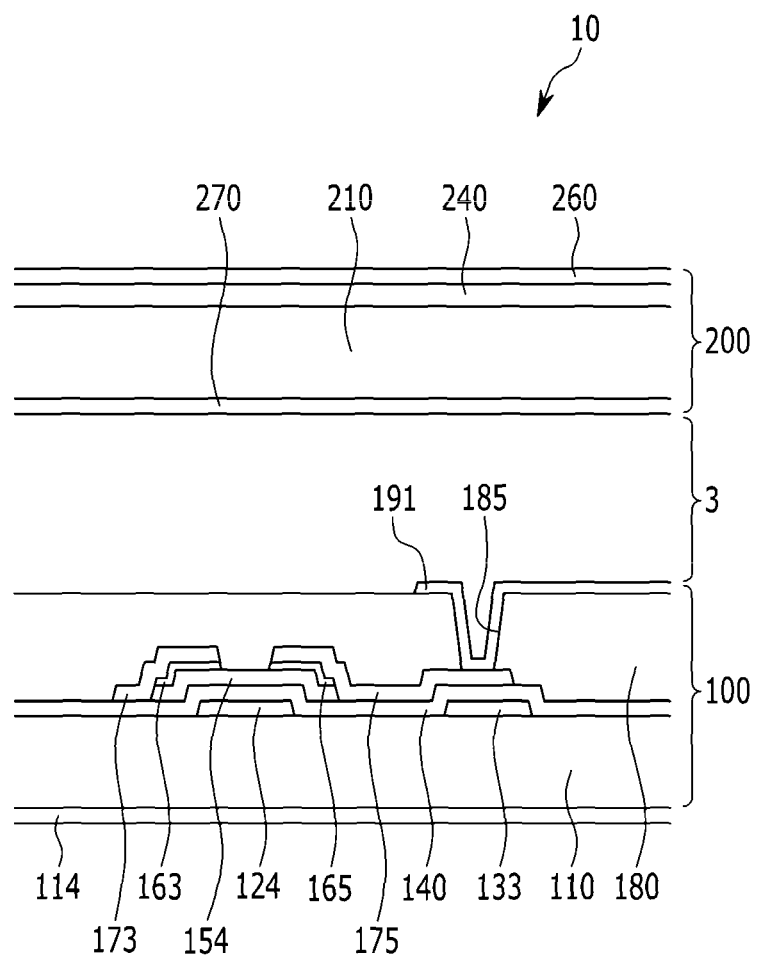
FIG. 2 is a cross-sectional view of a display panel according to the exemplary embodiment of the present inventive concept.

FIG. 2 is a cross-sectional view of a display panel according to the exemplary embodiment of the present inventive concept.

Referring to FIG. 2, the display panel 10 includes a lower panel 100, an upper panel 200, and a liquid crystal layer 3 provided between the two display panels 100 and 200. The lower panel 100 and the upper panel 200 face each other.

First, the lower panel 100 will be described.

In the lower panel 100, gate lines and storage lines are formed on a first substrate 110 made of transparent glass or plastic. The gate lines transmit a gate signal and substantially extend in a horizontal direction, and a gate electrode 124 is formed protruding from each gate line.

The storage electrode lines receive a predetermined voltage and substantially extend in a horizontal direction. Each storage electrode line includes a storage electrode 133 extending from the storage electrode line.

A gate insulating layer 140 is disposed on the gate electrode 124 and the storage electrode 133. The gate insulating layer 140 may be made of a silicon oxide (SiOx) or a silicon nitride (SiNx). The gate insulating layer 140 may have a multilayer structure including two insulating layers, each having a different physical property.

A semiconductor 154 is disposed on the gate insulating layer 140. The semiconductor 154 may be made of hydrogenated amorphous silicon or crystalline silicon. The semiconductor 154 may include an oxide semiconductor.

A pair of ohmic contacts 163 and 165 that face each other are disposed on the semiconductor 154. The ohmic contacts 163 and 165 may be made of a material such as n+ hydrogenated amorphous silicon in which an n-type impurity such as phosphorus is doped at a high concentration, or a silicide. The ohmic contacts 163 and 165 may be disposed on the semiconductor 154 to have a predetermined distance. When the semiconductor 154 is an oxide semiconductor, the ohmic contacts 163 and 165 may be omitted.

A data metal including a data line, a source electrode 173 and a drain electrode 175 are disposed on the ohmic contacts 163 and 165 and the gate insulating layer 140.

The data line transmits a data voltage, and substantially extends in a vertical direction and then crosses the gate line. The source electrode and the drain electrode 175 overlaps the gate electrode 124 and space apart a predetermined distance from each other.

One gate electrode 124, one source electrode 173, and one drain electrode 175 form one thin film transistor (TFT), together with the semiconductor 154. A channel of the thin film transistor is formed in the semiconductor 154 between the source electrode 173 and the drain electrode 175.

The data line and the drain electrode 175 are preferably made of a metal such as molybdenum, chromium, tantalum, titanium, aluminum, and the like, or an alloy thereof. The data line may have a multilayered structure including a refractory metal (not shown) and a low-resistive conductive layer (not shown). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, the data line 171 and the drain electrode 175 may be made of various metals or conductors other than the metals.

A passivation layer 180 is formed on the drain electrode 175, the source electrode 173, and an exposed portion of the semiconductor 154. The passivation layer 180 may be made of an inorganic insulating material such as a silicon nitride, a silicon oxide, and the like, an organic insulating material, a low-dielectric constant insulating material having a dielectric constant of less than about 4.0, or a combination thereof.

The passivation layer 180 includes a contact hole 185 exposing the drain electrode 175.

A pixel electrode 191 is formed on the passivation layer 180. The pixel electrode 191 is made of a transparent conductive material, for example, ITO, IZO, and the like, and is electrically connected with the drain electrode 175 through the contact hole 185.

An alignment layer (not shown) may be provided on the pixel electrode 191.

A first polarizer 114 is disposed below the first substrate 110. The first polarizer 114 has a polarization axis of a first direction and may transmit light vibrating in the first direction.

Next, the upper panel 200 will be described.

The upper panel 200 includes a second substrate 210, an electrostatic discharge prevention layer 240 disposed on the second substrate 210, a second polarizer 260 disposed on the electrostatic discharge prevention layer 240, and a common electrode 270 disposed below the second substrate 210 and thus facing the lower panel 100.

The electrostatic discharge prevention layer 240 has a planar shape and may be formed on the entire surface of the first substrate 110. The electrostatic discharge prevention layer 240 may be made of a transparent conductive material such ITO, IZO, and the like.

The second polarizer 260 has a polarization axis in a second direction and transmits light vibrating in the second direction. The second polarizer 260 absorbs light vibrating in the first direction and transmitted through the first polarizer 114, and transmits light vibrating in the second direction. In this case, the first direction and the second direction may be perpendicular to each other.

The common electrode 270 has a planar shape and may be formed on the entire surface of the first substrate 110. The common electrode 270 may be made of a transparent conductive material such as ITO, IZO, and the like. An alignment layer (not shown) may be formed below the common electrode 270.

In the above-described structure of the display panel 10, the common electrode 270 is disposed in the upper panel 200.

However, the common electrode 270 may disposed in the lower panel 100. This will be described referring to FIG. 3.

Figure 3:
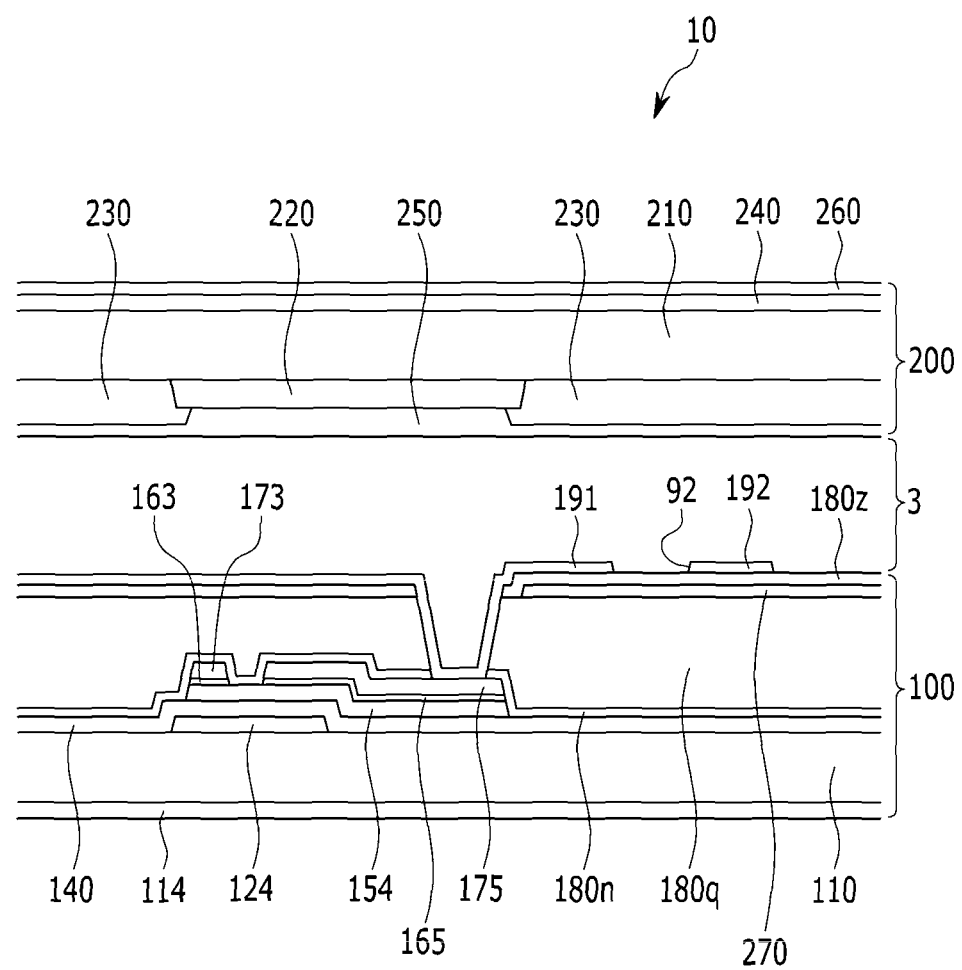
FIG. 3 is a cross-sectional view of a display panel according to another exemplary embodiment of the present inventive concept.

FIG. 3 is a cross-sectional view of a display panel according to another exemplary embodiment of the present inventive concept.

Referring to FIG. 3, a display panel 10 includes a lower panel 100, an upper panel 200, and a liquid crystal layer 3 provided between the two display panels 100 and 200. The lower panel 100 and the upper panel 200 face each other.

First, the lower panel 100 will be described.

A gate conductor including a gate line and a reference voltage line is provided on a first substrate 110 made of transparent glass or plastic. The gate line transmits a gate signal and includes a gate electrode 124 protruded from the gate line.

A gate insulating layer 140 made of a silicon nitride (SiNx) or a silicon oxide (SiOx) is provided on the gate electrode 124. The gate insulating layer 140 may have a multilayer structure including two insulating layers, each having a different physical property.

A semiconductor 154 made of amorphous silicon or crystalline silicon is provided on the gate insulating layer 140. The semiconductor 154 may include an oxide semiconductor.

Ohmic contacts 163 and 165 are provided on the semiconductor 154. The ohmic contacts 163 and 165 may be made of a material such as n+ hydrogenated amorphous silicon in which an n-type impurity such as phosphorus is doped at a high concentration, or a silicide. The ohmic contacts 163 and 165 may be disposed on the semiconductor 154 to have a predetermined distance. When the semiconductor 154 is an oxide semiconductor, the ohmic contacts may be omitted.

A data metal including a data line 171, a source electrode 173 and a drain electrode 175 is provided on the ohmic contacts 163 and 165 and the gate insulating layer 140.

The data line 171 transmits a data voltage, and substantially extends in a vertical direction and then crosses the gate line.

The source electrode 173 is provided on the same layer as the data line 171. The drain electrode 175 may have a portion which extends in parallel with the source electrode 173. Thus, the drain electrode 175 is parallel with a part of the source electrode 173.

The gate electrode 124, the source electrode 173, and the drain electrode 175 form one thin film transistor (TFT), together with the semiconductor 154. A channel of the thin film transistor is formed in the semiconductor 154 between the source electrode 173 and the drain electrode 175.

The data line 171 and the drain electrode 175 are preferably made of a metal such as molybdenum, chromium, tantalum, titanium, aluminum and the like, or an alloy thereof. The data line 171 may have a multilayered structure including a refractory metal (not shown) and a low-resistive conductive layer (not shown). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, the data line 171 and the drain electrode 175 may be made of various metals or conductors other than the metals.

A first passivation layer 180n is provided on the data conductors 173 and 175, the gate insulating layer 140, and an exposed portion of the semiconductor 154. The first passivation layer 180n may be made of an organic insulating material or an inorganic insulating material.

A second passivation layer 180q is provided on the first passivation layer 180n. The second passivation layer 180q can be omitted. The second passivation layer 180q may be a color filter. When the second passivation layer 180q is a color filter, the second passivation layer 180q can uniquely display one of primary colors. Examples of the primary colors are red, green, and blue, or yellow, cyan, and magenta.

A common electrode 270 is provided on the second passivation layer 180q. The common electrode 270 has a planar shape so as to be formed on the entire surface of the substrate 110 except an opening (not illustrated) which is formed on a region corresponding to the drain electrode 175. That is, the common electrode 270 may have a planar shape in a plane view.

A third passivation layer 180z is provided on the common electrode 270

The third passivation layer 180z may be made of an organic insulating material or an inorganic insulating material.

A pixel electrode 191 is provided on the third passivation layer 180z. The pixel electrode 191 is made of a transparent conductive material, for example, ITO, IZO, and the like, and is electrically connected with the drain electrode 175 through a contact hole 185.

An alignment layer (not shown) may be formed on the pixel electrode 191.

A first polarizer 114 is provided below the first substrate 110. The first polarizer 114 has a polarization axis of a first direction and may transmit light vibrating in the first direction.

Next, the upper panel 200 will be described.

The upper panel 200 includes a second substrate 210, an electrostatic discharge prevention layer 240 disposed on the second substrate 210, a second polarizer 260 disposed on the electrostatic discharge prevention layer 240, a light blocking member 220 disposed below the second substrate 210, a color filter 230, and an overcoat 250. The color filter 230 and the overcoat 250 are disposed below the second substrate 210.

The electrostatic discharge prevention layer 240 has a planar shape and may be formed on the entire surface of the first substrate 110. The electrostatic discharge prevention layer 240 may be made of a transparent conductive material such ITO, IZO, and the like.

The second polarizer 260 has a polarization axis in a second direction and transmits light vibrating in the second direction. The second polarizer 260 absorbs light vibrating in the first direction and transmitted through the first polarizer 114, and transmits light vibrating in the second direction. In this case, the first direction and the second direction may be perpendicular to each other.

The light blocking member 220 is called as a black matrix and blocks light.

When the second passivation layer 180q of the lower panel 100 is a color filter, the color filter 230 of the upper panel 200 may be omitted. In addition, the light blocking member 220 of the upper panel 200 may also be formed in the lower panel 100.

The overcoat 250 may be made of an organic insulator, prevent the color filter 230 from being exposed, and provide a flat surface. The overcoat 250 may be omitted.

An alignment layer (not shown) may be disposed on the overcoat 250.

In the above-described structure of the display panel 100, the common electrode 270 is disposed in the lower panel 100.

As described with reference to FIG. 2 and FIG. 3, the common electrode 270 may be disposed in one of the upper panel 200 and the lower panel 100. Other constituent elements of the display panel 10 may be variously implemented, and the present inventive concept is not limited to the other constituent elements of the display panel 10.

Figure 4:
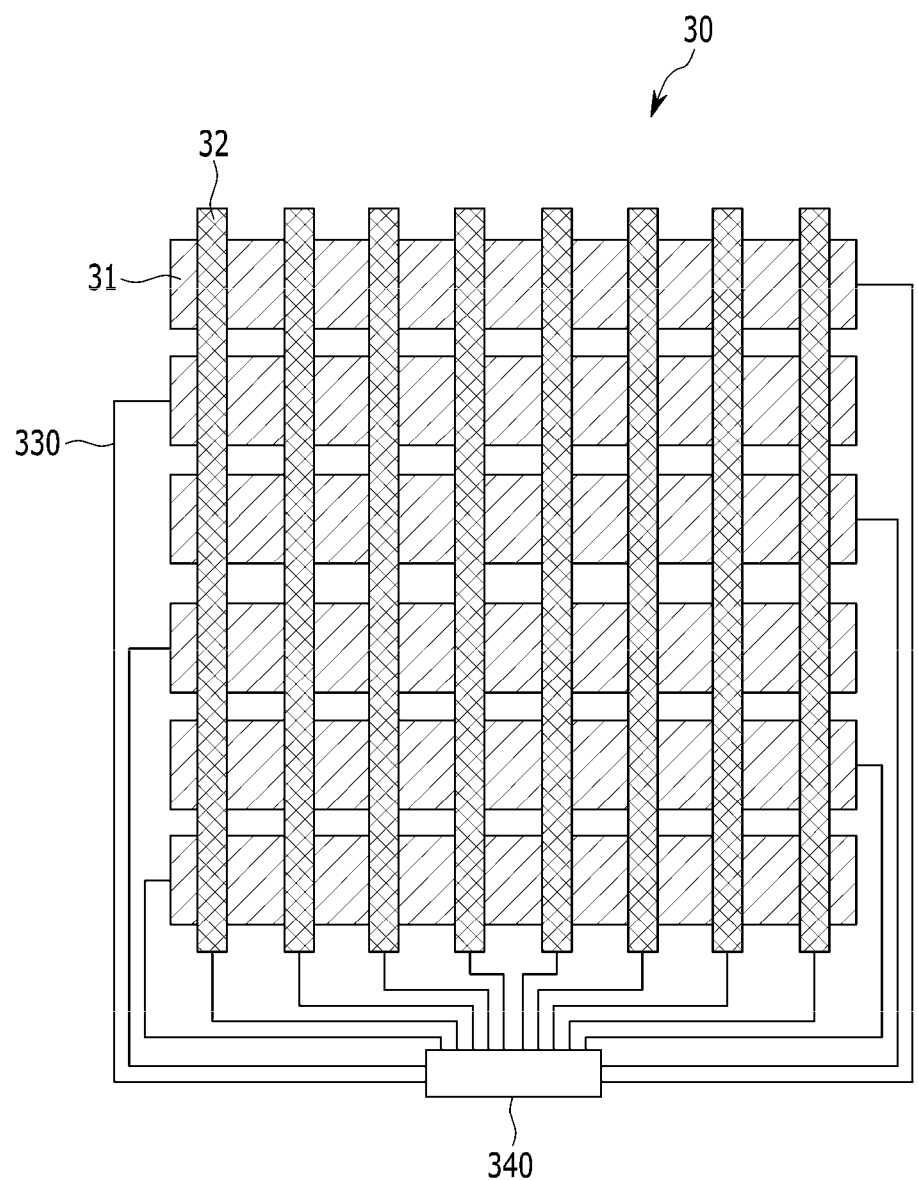
FIG. 4 is a schematic top plan view of a touch sensor according to an exemplary embodiment of the present inventive concept.

FIG. 4 is a schematic top plan view of a touch sensor according to an exemplary embodiment of the present inventive concept.

Referring to FIG. 4, a touch sensor 30 includes a plurality of driving electrodes 31 and a plurality of sensing electrodes 32 provided on the plurality of driving electrodes 31. An insulating layer (not shown) may be provided between the plurality of driving electrodes 31 and the plurality of sensing electrodes 32. The plurality of driving electrodes 31 and the plurality of sensing electrodes 32 are connected to a touch controller 340 through a sensing wire 330.

The plurality of driving electrodes 31 may be arranged in a first direction (i.e., a horizontal direction), and the plurality of sensing electrodes 32 may be arranged in a second direction (i.e., a vertical direction) that is perpendicular to the first direction. The plurality of driving electrodes 31 and the plurality of sensing electrodes 32 may be formed of a conductive material, for example, transparent conductive layers such as indium tin oxide (ITO), indium zinc oxide (IZO), etc. or a metal. Alternatively, the plurality of driving electrodes 31 and the plurality of sensing electrodes 32 may form a conductive layer mesh. The conductive layer mesh may be manufacturing by finely patterning the conductive material.

The conductive layer mesh may be formed by using a printing method, an imprinting method, a lithography method, and the like. The printing method is a method for directly forming a transparent electrode (or wire) with a transparent conductive material (or a metallic material) on a substrate using a gravure or offset method. The imprinting method is a method for forming a transparent electrode (or a wire) by forming a fine pattern on a transparent conductive film or a metal film and then forming a transparent electrode (or wire) by etching the transparent conductive film (or wire) through the fine pattern. The lithography method is a method where the fine pattern is formed on the substrate through a source such as light, a laser, or an electronic beam, and the transparent conductive layer (or metal layer) is etched by using the fine pattern to form the transparent electrode (or wire).

A metal pattern forming the metal mesh may have a line width of about 0.1 μm to about 10 μm formed with a metallic material such as copper (Cu), aluminum (Al), molybdenum (Mo), silver (Ag), and the like. The plurality of driving electrodes 31 and the plurality of sensing electrodes 32 formed of the metal mesh may have high conductivity and high transparency.

The insulating layer is provided between the plurality of driving electrodes 31 and the plurality of sensing electrodes 32 for insulation therebetween. The insulating layer may be made of an inorganic insulating material such as a silicon oxide (SiOx), a silicon nitride (SiNx), and the like. Alternatively, as the insulating layer, an organic insulating material such as a cellulose derivative, an olefin-based resin, an acryl-based resin, a vinyl chloride-based resin, a styrene-based resin, a polyester-based resin, a polyamide-based resin, a polycarbonate-based resin, a polycycloolefin resin, or an epoxy resin may be used.

Since the plurality of driving electrodes 31 and the plurality of sensing electrodes 32 are separated by the insulating layer, capacitance is formed between the driving electrode 31 and the sensing electrode 32.

The touch controller 340 applies a touch sensing signal to the plurality of driving electrodes 31 through the plurality of sensing wires 330, and detects a touch location by receiving a sense signal that indicates change in capacitance of the plurality of sensing electrodes 32 through the plurality of sensing wires 330.

Figure 5:
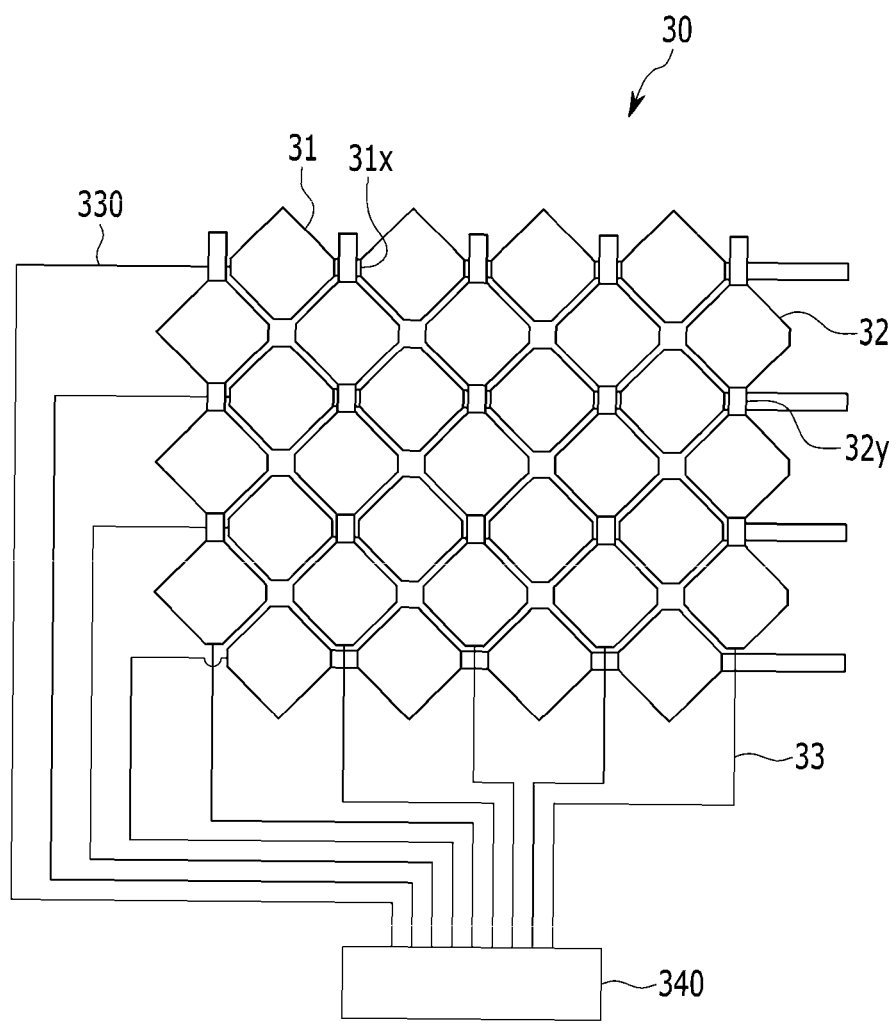
FIG. 5 is a schematic top plan view of a touch sensor according to another exemplary embodiment of the present inventive concept.

FIG. 5 is a schematic top plan view of a touch sensor according to another exemplary embodiment of the present inventive concept.

Referring to FIG. 5, a touch sensor 30 includes a plurality of driving electrodes 31 and a plurality of sensing electrodes 32. The plurality of driving electrodes 31 and the plurality of sensing electrodes 32 are disposed on the same plane and do not overlap each other. The plurality of driving electrodes 31 and the plurality of sensing electrodes 32 may be formed in the shape of a rhombus, and sides of adjacent rhombuses may be arranged in parallel with each other.

The plurality of driving electrodes 31 are connected with each other in a first direction (i.e., a horizontal direction) by first connection electrodes 31x. The plurality of sensing electrodes 32 are connected with each other in a second direction (i.e., a vertical direction) by second connection electrodes 32y.

An insulating layer (not shown) is provided between the first connection electrodes 31x and the second connection electrodes 32y. That is, the first connection electrodes 31x and the second connection electrodes 32y cross each other, but they are insulated from each other.

The plurality of driving electrodes 31 and the plurality of sensing electrodes 32 may be made of a transparent conductive layer such as indium tin oxide (ITO), indium zinc oxide (IZO) and the like. Alternatively, the plurality of driving electrode 31 and the plurality of sensing electrodes 32 may be made of a metal mesh.

The driving electrodes 31 and the sensing electrodes 32 are separated from each other but formed in the same plane, and capacitance is formed between the driving electrodes 31 and the sensing electrodes 32.

The touch controller 340 applies a touch sensing signal to the plurality of driving electrodes 31 through a plurality of sensing wires 330, and detects a touch location by receiving a sense signal that indicates change in capacitance of the plurality of sensing electrodes 32 through the plurality of sensing wires 330.

Hereinafter, a method for reducing unnecessary power consumption by not outputting a touch detection signal in an idle mode from the touch sensor 30 in the display device having the structure described with reference to FIG. 1 to FIG. 5 will be described.

Figure 6:
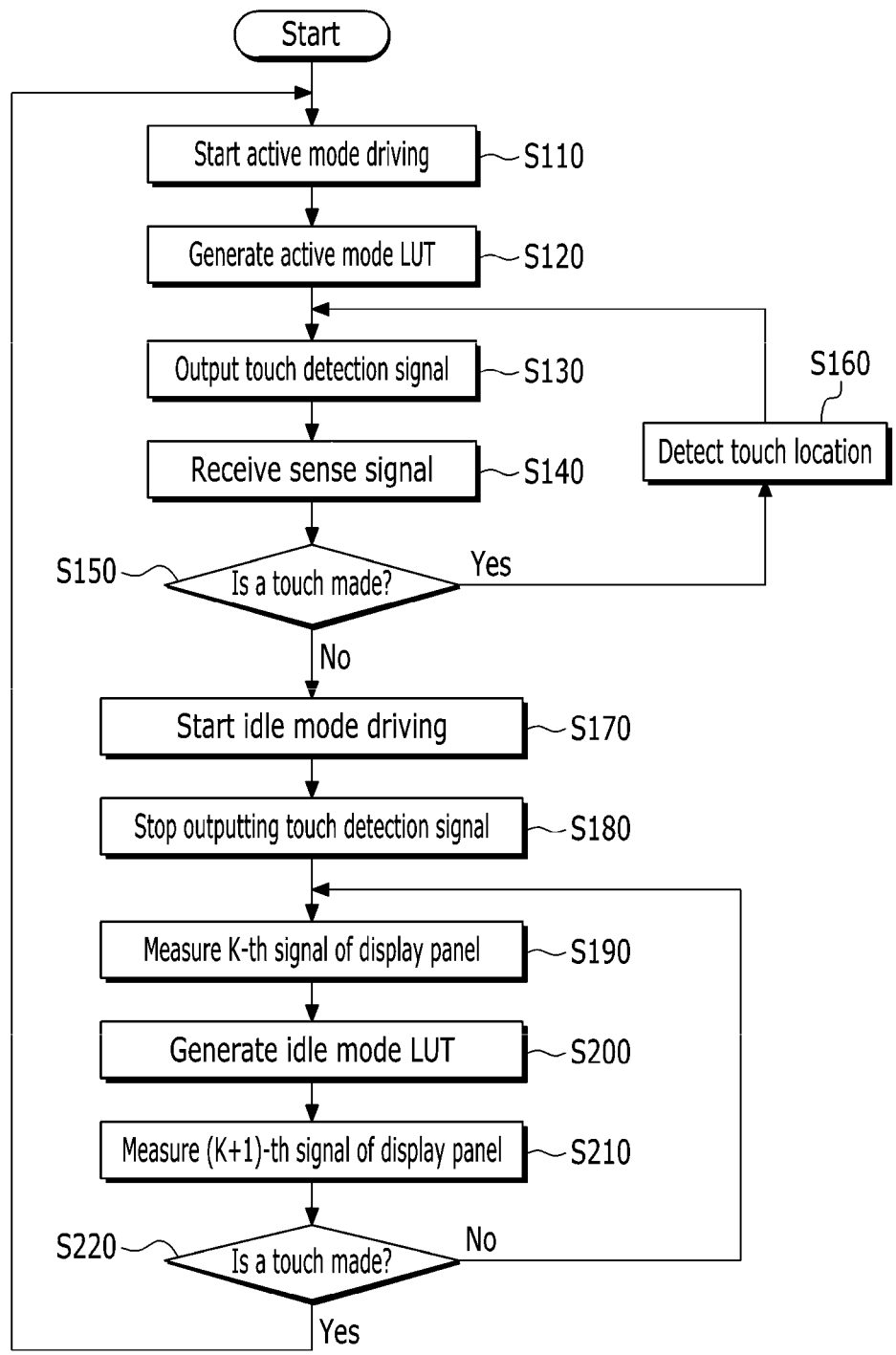
FIG. 6 is a flowchart of a driving method of a display device according to an exemplary embodiment of the present inventive concept.

FIG. 6 is a flowchart of a driving method of the display device according to the exemplary embodiment of the present inventive concept.

Referring to FIG. 6, the touch sensor of the display device starts active mode driving when power is turned on or a specific event occurs (S110). In the active mode driving, the touch controller 340 applies a touch detection signal to the plurality of driving electrodes 31, which implies an operation for receiving a sense signal that indicates capacitance variation from the plurality of sensing electrodes 32.

The touch controller 340 receives sense signals from the plurality of sensing electrodes 32 for one frame period while the touch detection signal is sequentially applied to the plurality of driving electrodes 31 and stores the sense signals to an active mode look-up table (LUT) (S120). The active mode LUT stores intensity of sensing signals corresponding to touch detection signals in a state that touch is not made. For example, the touch controller 340 converts a first sense signal received from the plurality of sensing electrodes 32 by applying a touch detection signal to driving electrodes 31 in the first row into a digital signal and stores the digital signal in the active mode LUT, and converts a second sense signal received from the plurality of sensing electrodes 32 by applying a touch detection signal to driving electrodes 31 in the second row and stores the digital signal in the active mode LUT. By repeating the above procedure to the last row, the active mode LUT can be generated. The active mode LUT becomes a reference in the touch sensor 30 for detection of a touch location.

After the active mode LUT is generated, the touch controller 340 sequentially outputs a touch detection signal to the plurality of driving electrodes 31 (S130).

The touch controller 340 receives a sense signal corresponding to an output of a touch detection signal (S140). The touch controller 340 can convert a detection signal to a digital signal.

The touch controller 340 determines whether a touch is made by comparing sense signals with the active mode LUT (S150) which is a reference value. When the sense signal is equal to a value stored in the active mode LUT, the touch sensor decides that no touch is made, and when the sense signal is not equal to a value recorded in the active mode LUT, the touch sensor decides that a touch is made. The touch sensor may decide that a touch is made only when the sense signal is different from the value stored in the active mode LUT more than a predetermined value.

When it is determined that a touch is made, the touch controller 340 decides a touch location (S160). The touch controller 340 may decide a location indicating a value that is different from a value stored in the active mode LUT as a touch location. The touch controller 340 may track the touch location by periodically repeating the outputting (S130) of the touch detection signal and the receiving (S140) of the sense signal.

When it is determined that no touch is made, the touch controller 340 starts an idle driving mode (S170). The idle driving mode means that the touch controller 340 stops outputting of a touch detection signal and detects capacitance variation of the plurality of sensing electrodes 32 according to a signal of the display panel 10 to determine whether a touch is made.

The touch controller 340 stops outputting of the touch detection signal as the idle mode driving is started (S180).

The touch controller 340 measures a K-th signal of the display panel 10 (S190). The K-th signal of the display panel 10 implies a change in a sense signal received from the plurality of sensing electrodes 32 by a ripple of a voltage of the common electrode 270. The ripple of the voltage of the common electrode 270 is generated by an inversion driving of a LCD panel The liquid crystal display performs inversion driving for prevention of deterioration of liquid crystals. When the liquid crystal display is in an inversion driving method, a polarity of the data voltage is changed from a positive value to a negative value or vise versa with reference to the common voltage for each frame. The inversion driving method includes a frame inversion driving method in which a polarity of a data voltage is inverted for at least one frame, a line inversion driving method in which a polarity of a data voltage is inverted in a row direction or a column direction, and a dot inversion driving method in which a polarity of a data voltage is inverted in a row direction and a column direction.

Hereinafter, the display panel 10 using the frame inversion method will be explained as an example.

When the display panel 10 is in a frame inversion driving method, a data voltage applied to a data line is inverted from a positive voltage to a negative voltage or vice versa and accordingly a common voltage applied to the common voltage 270 is fluctuated. The common electrode 270 and the electrostatic discharge prevention layer 240 are formed on the entire surface of the display panel 110 as a plate shape such that one capacitor is formed. Since the common voltage of the common electrode 270 is fluctuated because the polarity of the data voltage is changed, a voltage of the electrostatic discharge prevention layer 240 is fluctuated due to coupling with the common electrode 270. That is, the voltage of the electrostatic discharge prevention layer 240 is fluctuated substantially equally with the common voltage. The electrostatic discharge prevention layer 240 of the display panel 10 forms another capacitor with the plurality of sensing electrodes 32 of the touch sensor 30. As the voltage of the electrostatic discharge prevention layer 240 is fluctuated, voltages of the plurality of sensing electrodes 32 are fluctuated due to coupling. The touch controller 340 can receive a voltage of the plurality of sense electrodes 32, fluctuated due to coupling with the electrostatic discharge prevention layer 240, that is, a sense signal.

The touch controller 340 generates an idle mode LUT by converting the received sense signal to a digital signal when no touch is made (S200). The idle mode LUT may be a record of an intensity of the sense signal received from the plurality of sensing electrodes 32 for a K-th frame. The touch controller 340 may generates an idle mode LUT by converting the sense signal received from the plurality of sensing electrodes 32 to the digital signal for the K-th frame. The idle mode LUT becomes a reference for determination of a touch of the touch sensor 30.

The touch controller 340 measures a (K+1)-th signal of the display panel 10 (S210) for (K+1)-th frame. The (K+1)-th signal of the display panel 10 implies a sense signal received from the plurality of sensing electrodes 32 due to a ripple of the common voltage generated when an inverted data voltage having opposite polarity to the previous frame is applied to the plurality of pixels during a (K+1)-th frame.

The touch controller 340 determines whether a touch is made by comparing the sense signal received during the (K+1)-th frame with the idle mode LUT (S220). Here, the absolute value of the data voltage in the K-th frame and in the (K+1)-th frame is assumed to be equal. When no touch is made, the sense signal is equal to values recorded in the idle mode LUT, and when a touch is made, the sense signal is not equal to values recorded in the idle mode LUT.

In general, an image of the K-th frame and an image of the (K+1)-th frame, which is adjacent to the K-th frame, are not greatly different from each other. That is, all data voltages applied to all pixels of the display panel 10 are almost equal to each other in the K-th frame and in the (K+1)-th frame. Thus, when no touch is made, a ripple of the common voltage generated when the data voltage is applied to the plurality of pixels during the K-th frame and a ripple of the data voltage generated when the data voltage is applied to the plurality of pixels during the (K+1)-th frame are almost equal to each other and received sense signals are almost equal to each other.

When it is determined that no touch is made, the touch controller 340 iteratively performs measuring of the K-th signal of the display panel (S190), generating the idle mode LUT (S200), and measuring of the (K+1)-th signal of the display panel 10 (S210).

When a touch is made to the touch sensor 30, another capacitor is formed between the touch sensor 30 and a touch object such that sense signals received from the plurality of sensing electrodes 32 are different from each other due to a ripple of the common voltage. Thus, the touch controller 340 determines that a touch is made when the received sense signal is different from the values recorded in the idle mode LUT. A result of simulation for determination of a touch will be described with reference to FIG. 7 to FIG. 9.

When determining that a touch is made, the touch controller 340 starts active mode driving (S100).

In the above description, the sense signal is generated from coupling between the common electrode 270 and the electrostatic discharge prevention layer 240 and coupling between the electrostatic discharge prevention layer 240 and the plurality of sensing electrodes 32. However, the electrostatic discharge prevention layer 240 may be omitted according to a configuration of the display device, and in this case, the sense signal may be generated from coupling between the common electrode 270 and the plurality of sensing electrodes 32.

Now, a result of a simulation of a process for determination of a touch in an idle mode using a ripple of the common voltage applied to the common electrode 270 according to driving of the display device will be described with reference to FIG. 7 to FIG. 9.

Figure 7:
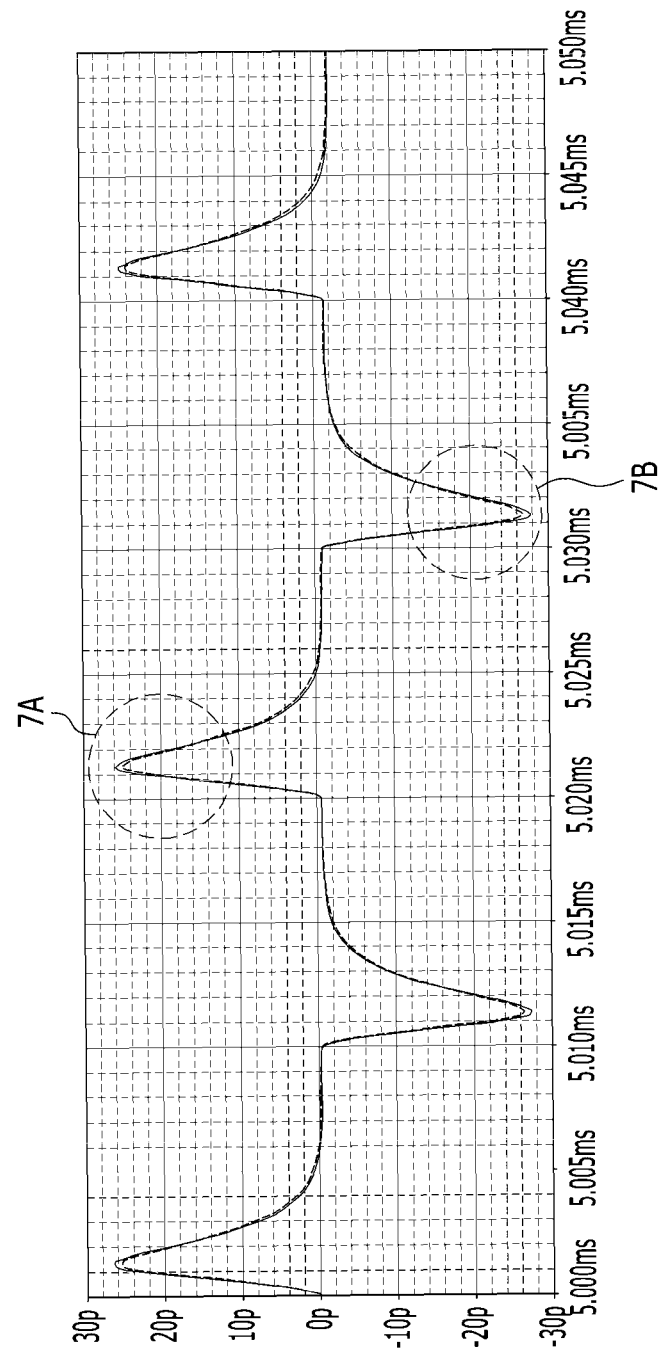
FIG. 7 is a graph illustrating a result of an experiment of a ripple of a common voltage according to driving of the display device according to the exemplary embodiment of the present inventive concept.

FIG. 7 is a graph illustrating a result of an experiment of a ripple of the common electrode according to driving of the display device according to the exemplary embodiment of the present inventive concept. FIG. 8 is an enlarged graph of an area 7A in FIG. 7. FIG. 9 is an enlarged graph of an area 7B in FIG. 7.

Figure 8:
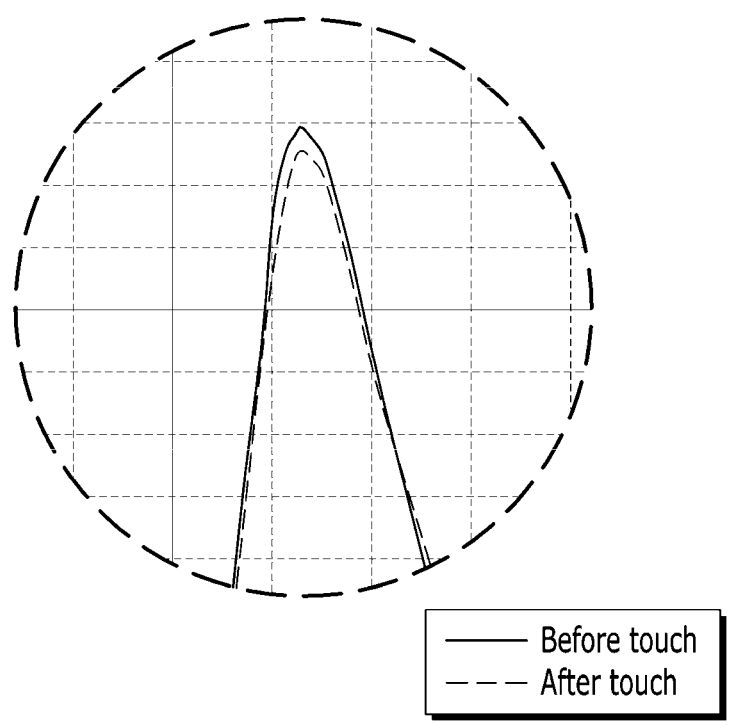
FIG. 8 is a graph of enlargement of an area 7A in FIG. 7.
Figure 9:
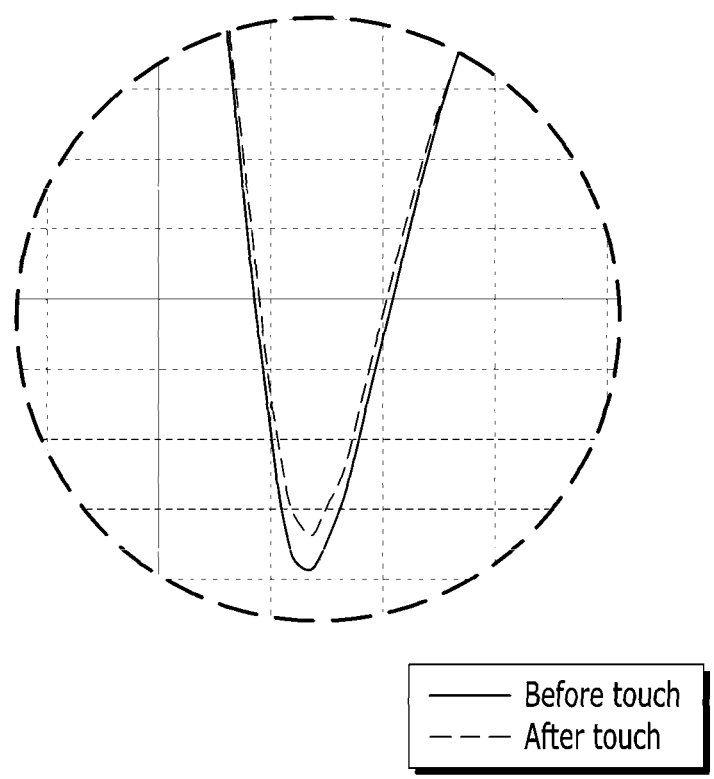
FIG. 9 is a graph of enlargement of an area 7B in FIG. 7.

Referring to FIG. 7 to FIG. 9, a first capacitor formed of the common electrode 270 and the electrostatic discharge prevention layer 240 and a second capacitor formed of the electrostatic discharge prevention layer 240 and the plurality of sensing electrodes 32 can be modeled as a circuit before touch. In addition, a third capacitor formed between the plurality of sensing electrodes 32 and a touch object may be additionally modeled as a circuit after touch. In this case, capacitance variation before touch and after touch can be measured by applying a voltage of a waveform corresponding to a ripple of the common voltage to the common electrode 270. Such a simulation model can be adaptively implemented in consideration of a configuration of an actual display device and voltages used to operate the actual display device. A detailed description for a detailed configuration of the simulation model will be omitted.

FIG. 7 shows a result of simulation of capacitance variation at a portion that corresponds to the electrostatic discharge prevention layer 240 using the simulation model before touch and after touch. As shown in FIG. 7, capacitance is fluctuated to a positive value and a negative value due to a ripple of the common voltage. That is, the capacitance is measured to be the positive peak in a frame where a positive voltage is applied as a data voltage, and the capacitance is measured to be the negative peak in a frame where a negative voltage is applied as a data voltage.

As shown in FIG. 8, in the positive peak portion 7A, capacitance before touch is measured to be higher than capacitance after touch. In a result of one experiment, in the positive peak portion 7A, capacitance before touch was measured to be 25.891 pF and capacitance after touch was measured to be 24.962 pF, and a difference therebetween was 0.929 pF.

As shown in FIG. 9, in the negative peak portion 7B, capacitance before touch is measured to be lower than capacitance after touch. In a result of one experiment, the capacitance before touch in the negative peak portion 7B was measured to be −27.391 pF and the capacitance after touch in the negative peak portion 7B was measured to be −26.414 pF, and a difference therebetween was 0.977 pF.

As described, an absolute value of the capacitance after touch was smaller than an absolute value of the capacitance before touch, and a difference therebetween was approximately 0.9 pF to 1.0 pF. In general, the touch sensor 30 detects a touch location by sensing capacitance variation of about 0.1 pF to 0.2 pF, and thus whether a touch is made or not can be sufficiently detected by the touch sensor 30 using a ripple of the common voltage in the display panel 10.

In the above-described display device, the display panel 10 and the touch sensor 30 are separately provided and then bonded to each other.

However, the touch sensor 30 may be embedded as an in-cell touch sensor or an on-cell touch sensor in the display panel 10. This will be described with reference to FIG. 10 and FIG. 11.

Figure 10:
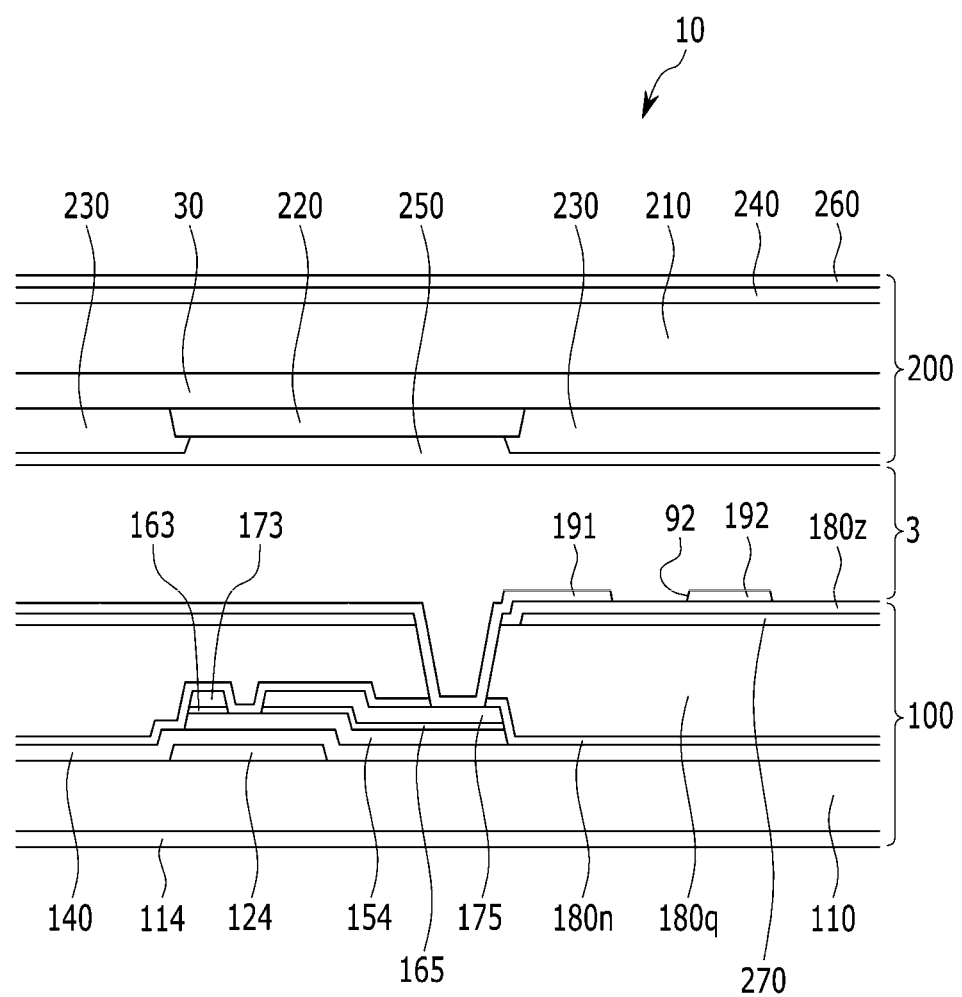
FIG. 10 is a cross-sectional view of a display panel according to another exemplary embodiment of the present inventive concept.

FIG. 10 is a cross-sectional view of a display panel according to another exemplary embodiment of the present inventive concept. FIG. 10 shows an exemplary embodiment in which a touch sensor 30 is embedded in a display panel 10, in-cell touch sensor.

Unlike the exemplary embodiment of FIG. 3, an upper panel 200 includes a second substrate 210, an electrostatic discharge prevention layer 240 provided on the second substrate 210, a second polarizer 260 provided on the electrostatic discharge prevention layer 240, a touch sensor 30 provided below the second substrate 210, a light blocking member 220 provided below the touch sensor 30, and a color filter 230 and an overcoat 250 provided below the touch sensor 30.

That is, the touch sensor 30 is formed in the upper panel 200 and thus is disposed between the first substrate 110 and the second substrate 210. In such a configuration, the common electrode 270 and the touch sensor 30 can form one capacitor, and whether a touch is made or not can be detected using a ripple of the common electrode 270 in an idle mode.

Figure 11:
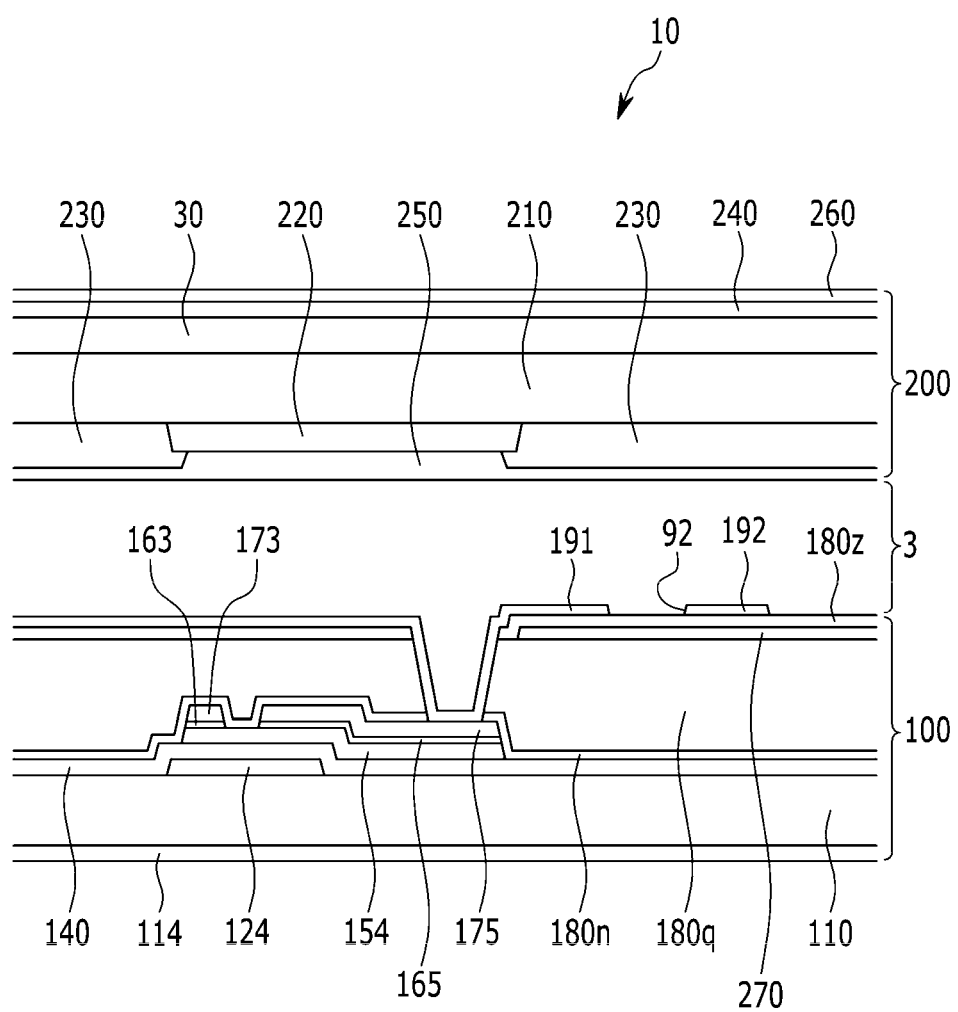
FIG. 11 is a cross-sectional view of a display panel according to another exemplary embodiment of the present inventive concept.

FIG. 11 is a cross-sectional view of a display panel according to a display panel according to another exemplary embodiment of the present inventive concept. FIG. 11 shows an exemplary embodiment in which a touch sensor 30 is embedded in a display panel 10, on-cell touch sensor.

Unlike the exemplary embodiment of FIG. 3, an upper panel 200 includes a second substrate 210, a touch sensor 30 provided on the second substrate 210, an electrostatic discharge prevention layer 240 provided on the touch sensor 30, a second polarizer 260 provided on the electrostatic discharge prevention layer 240, a light blocking member 220 provided below the second substrate 210, and a color filter 230 and an overcoat 250 provided below the second substrate 210.

That is, the touch sensor 30 is provided right above the second substrate 210 rather than between the first substrate 110 and the second substrate 210. In such a configuration, the common electrode 270 and the touch sensor 30 can form one capacitor, and whether a touch is made or not can be detected using a ripple of the common electrode 270 in an idle mode.

In FIG. 10 and FIG. 11, a touch sensor 30 may be formed with the configuration described with reference to FIG. 4 and FIG. 5 or other various configurations.

In addition, the display panel 10 including the in-cell touch sensor and the on-cell touch sensor exemplarily shown in FIG. 10 and FIG. 11 is an example, and may be variously modified within a range where the common electrode 270 and the touch sensor 30 can form a capacitor.

Meanwhile, the touch sensor 30 in the display device where the display panel 10 and the touch sensor 30 are separately provided may be formed with various shapes. Such an exemplary embodiment will be described with reference to FIG. 12 to FIG. 15.

Figure 12:
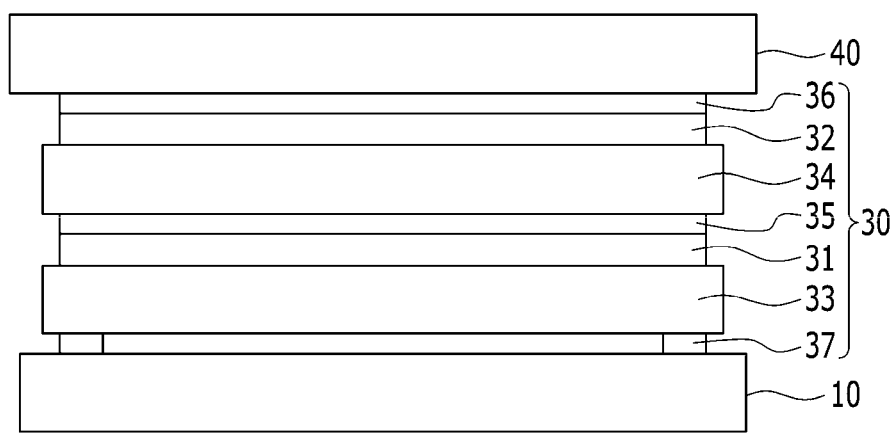
FIG. 12 is a cross-sectional view of a display device according to another exemplary embodiment of the present inventive concept.

FIG. 12 is a cross-sectional view of a display device according to another exemplary embodiment of the present inventive concept.

Referring to FIG. 12, a display device includes a display panel 10, a touch sensor 30 provided on the display panel 10, and a cover glass 40 provided on the touch sensor 30.

The touch sensor 30 includes a first substrate 33 where a plurality of driving electrodes 31 are disposed and a second substrate 34 where a plurality of sensing electrodes 32 are disposed. The first substrate 33 and the second substrate 34 may be made of transparent plastic such as PET and the like.

The plurality of driving electrodes 31 are disposed on the first substrate 33 and the second substrate 34 is disposed on the plurality of driving electrodes 31. A first adhesive layer 35 is provided between the plurality of driving electrodes 31 and the second substrate 34 to bond the first substrate 33 where the plurality of driving electrodes 31 are disposed and the second substrate 34 where the plurality of sensing electrodes 32 are disposed. The plurality of sensing electrodes 32 are disposed on the second substrate 34 and the cover glass 40 is disposed on the plurality of sensing electrodes 32. A second adhesive layer 36 is provided between the plurality of sensing electrodes 32 and the cover glass 40 to bond the cover glass 40 and the touch sensor 30. An adhesive tape layer 37 is provided at edges below the first substrate 33 to bond the touch sensor 30 and the display panel 10. The touch sensor 30 described with reference to FIG. 4 may have such a structure.

Figure 13:
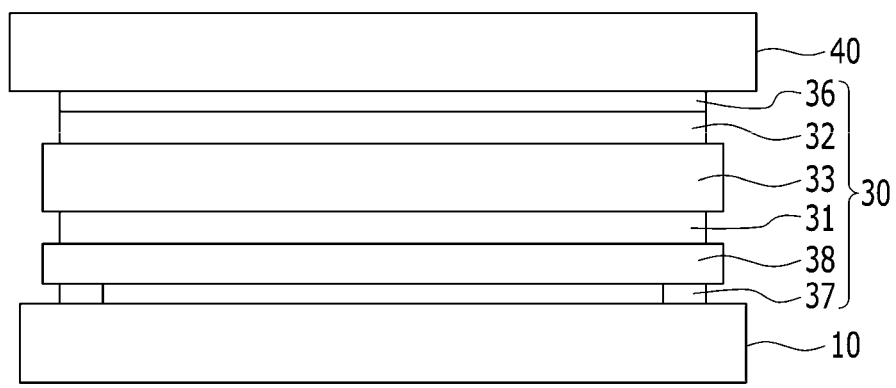
FIG. 13 is a cross-sectional view of a display device according to another exemplary embodiment of the present inventive concept.

FIG. 13 is a cross-sectional view of a display device according to another exemplary embodiment of the present inventive concept.

Referring to FIG. 13, a display device includes a display panel 10, a touch sensor 30 provided on the display panel 10, and a cover glass 40 provided on the touch sensor 30.

The touch sensor 30 includes a first substrate 33 in which a plurality of driving electrodes 31 are disposed in one side thereof and a plurality of sensing electrodes 32 are disposed in the other side. The first substrate 33 may be made of transparent glass.

The plurality of driving electrodes 31 are disposed below the first substrate 33 and an anti-glare layer 38 is disposed below the plurality of driving electrodes 31. The plurality of sensing electrodes 32 are disposed above the first substrate 33 and the cover glass 40 is disposed above the plurality of sensing electrodes 32. A second adhesive layer 36 is provided between the plurality of sensing electrodes 32 and the cover glass 40 to bond the cover glass 40 and the touch sensor 30. An adhesive tape layer 37 is provided at edges below the anti-glare layer 38 to bond the touch sensor 30 and the display panel 10. The touch sensor 30 of FIG. 4 may have such a structure.

Figure 14:
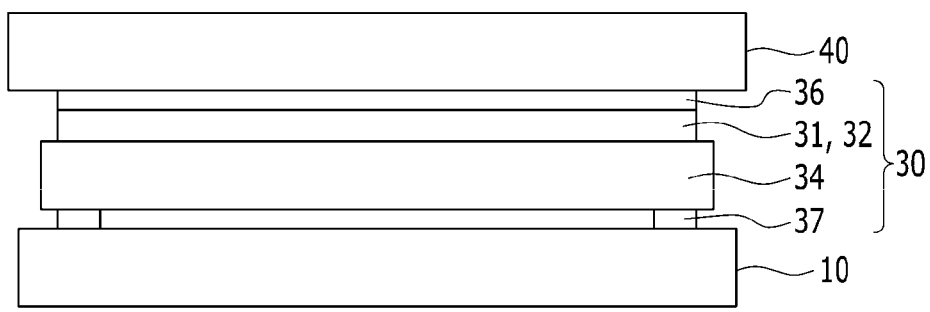
FIG. 14 is a cross-sectional view of a display device according to another exemplary embodiment of the present inventive concept.

FIG. 14 is a cross-sectional view of a display device according to another exemplary embodiment of the present inventive concept.

Referring to FIG. 14, a display device includes a display panel 10, a touch sensor 30 disposed above the display panel 10, and a cover glass 40 disposed above the touch sensor 30.

The touch sensor 30 includes a first substrate 33 in which a plurality of driving electrodes 31 and a plurality of sensing electrodes 32 are disposed in the same plane. The first substrate 33 may be made of transparent glass. In FIG. 5, the plurality of driving electrodes 31 and the plurality of sensing electrodes 32 may be disposed in the same plane with the above-stated stricture.

The plurality of driving electrodes 31 and the plurality of sensing electrodes 32 are disposed on the first substrate 33 and the cover glass 40 is disposed thereon. A second adhesive layer 36 is provided between the plurality of driving electrodes 31, the plurality of sensing electrodes 32, and the cover glass 40 to bond the cover glass 40 and the touch sensor 30. An adhesive tape layer 37 is disposed at edges below the first substrate 33 to bond the touch sensor 30 and the display panel 10.

Figure 15:
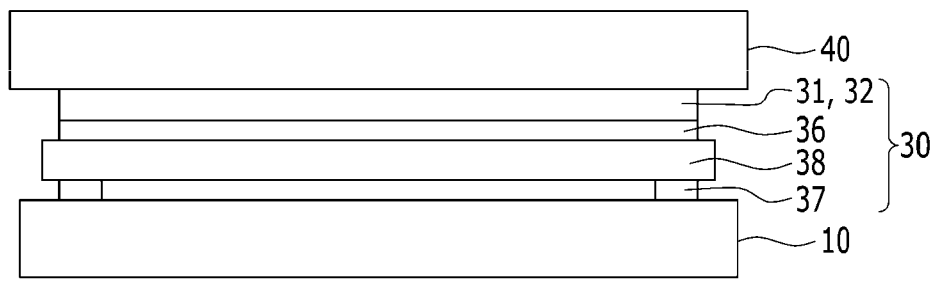
FIG. 15 is a cross-sectional view of a display device according to another exemplary embodiment of the present inventive concept.

FIG. 15 is cross-sectional view of a display device according to another exemplary embodiment of the present inventive concept.

Referring to FIG. 15, a display device includes a display panel 10, a touch sensor 30 disposed above the display panel 10, and a cover glass 40 disposed above the touch sensor 30.

The touch sensor 30 includes a plurality of driving electrodes 31 and a plurality of sensing electrodes 32 disposed on the cover glass 40. That is, the plurality of driving electrodes 31 and the plurality of sensing electrodes 32 are patterned on the cover glass 40. The plurality of driving electrodes 31 and the plurality of sensing electrodes 32 are bonded to an anti-glare layer 38 by a second adhesive layer 36. An adhesive tape layer 37 is provided at edges below the anti-glare layer 38 to bond the touch sensor 30 and the display panel 10.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
    a display panel comprising a pixel electrode receiving a data voltage and a common electrode receiving a common voltage; and
    a touch sensor comprising a plurality of driving electrodes and a plurality of sensing electrode, the touch sensor disposed above the common electrode,
    wherein the touch sensor applies a touch detection signal to the plurality of driving electrode and detects a touch location by receiving a sense signal from the plurality of sensing electrode in an active mode, and the touch sensor stops applying a touch detection signal to the plurality of driving electrode and the plurality of sensing electrodes in an idle mode and determines whether a touch is made by receiving sense signals of the plurality of sensing electrodes that are fluctuated by a ripple of the common voltage applied to the common electrode according to driving of the display panel in the idle mode in which a touch controller stops outputting of the touch detection signal.

2. The display device of claim 1, wherein the display panel is driven with an inversion driving method in which a polarity of the data voltage is inverted from a positive value to a negative value with reference to the common voltage, and the common voltage is fluctuated according to the inversion of the data voltage.

3. The display device of claim 2, further comprising an electrostatic discharge prevention layer provided at an outer surface of the display panel,
wherein a voltage of the electrostatic discharge prevention layer is fluctuated due to coupling with the common electrode.

4. The display device of claim 3, wherein the sense signals of the plurality of sensing electrodes are fluctuated due to coupling with the electrostatic discharge prevention layer.

5. The display device of claim 1, wherein the touch sensor generates an active mode look-up table (LUT) by receiving sense signals from the plurality of sensing electrodes for one frame during which a touch detection signal is applied to the plurality of driving electrodes in the active mode.

6. The display device of claim 5, wherein the touch sensor generates the active mode LUT and then determines whether a touch is made by comparing a sense signal that corresponds to the touch detection signal applied to the plurality of driving electrodes with the active mode LUT.

7. The display device of claim 6, wherein the touch sensor determines that no touch is made when the sense signal that corresponds to the touch detection signal equals a value recorded in the active mode LUT, and determines that a touch is made when a sense signal corresponding to the touch detection signal does not equal a value recorded in the active mode LUT.

8. The display device of claim 7, wherein, when determining that a touch is made, the touch sensor detects a spot indicating a value that is different from values recorded in the active mode LUT as a touch location.

9. The display device of claim 7, wherein, when the touch sensor determines that no touch is made, the touch sensor starts the idle mode and stops outputting the touch detection signal.

10. The display device of claim 9, wherein the touch sensor generates an idle mode LUT by receiving sense signals of the plurality of sensing electrodes, that are fluctuated by a ripple of a common voltage generated for one frame of the display panel.

11. The display device of claim 10, wherein the touch sensor determines whether a touch is made by comparing the sense signals of the plurality of sensing electrodes, that are fluctuated by a ripple of the common voltage with the idle mode LUT for the next frame of the display panel.

12. A method for driving a display device including a pixel electrode receiving a data voltage, a common electrode receiving a common voltage, a plurality of driving electrodes, and a plurality of sensing electrodes, comprising:
generating sense signals from the plurality of sensing electrodes for one frame during which a touch detection signal is applied to the plurality of driving electrodes;
storing the sense signals to an active mode look-up table (LUT); and
comparing sense signals of one frame with the sense signals stored in the active mode LUT to determine whether a touch is made and stopping outputting the touch detection signal when no touch is made; and
stopping outputting the touch detection signal in an idle mode when no touch is made,
wherein the sense signals of the plurality of sensing electrodes that are fluctuated by a ripple of the common voltage applied to the common electrode according to driving of a display panel in the idle mode in which a touch controller stops outputting of the touch detection signal, and
wherein the plurality of driving electrode and the plurality of sensing electrodes are disposed above the common electrode.

13. The method for driving the display device of claim 12, further comprising detecting capacitance variation of the plurality of sensing electrode to determine whether a touch is made during one frame while no touch detection signal is applied to the plurality of driving electrodes and storing sense signals to an idle mode LUT when it is determined that no touch is made.

14. The method for driving the display device of claim 13, further comprising determining whether a touch is made by comparing sense signals of the plurality of sensing electrodes for one frame with the idle mode LUT.

15. The method for driving the display device of claim 14, wherein when it is determined that no touch is made, the detecting capacitance variation of the plurality of sensing electrode to determine whether a touch is made is performed.

16. The method for driving the display device of claim 14, wherein when it is determined that a touch is made, the method is re-performed from the generating sense signals from the plurality of sensing electrodes for one frame during which a touch detection signal is applied to the plurality of driving electrodes.

17. The method for driving the display device of claim 14, further comprising, when it is determined that touch is made, determining a spot indicating a value that is different from values recorded in the active mode LUT as a touch location.

18. The method for driving the display device of claim 14, further comprising:
applying the data voltage after inverting a polarity of the data voltage from a positive value to a negative value with reference to the common voltage; and
generating a ripple of the common voltage according to the inversion of the data voltage.

19. The method for driving the display device of claim 18, further comprising providing an electrostatic discharge prevention layer between the common electrode and the plurality of sensing electrodes,
wherein a voltage of the electrostatic discharge prevention layer is fluctuated due to coupling with the common electrode.

20. The method for driving the display device of claim 19, wherein the sense signals of the plurality of sensing electrodes are fluctuated due to coupling with the electrostatic discharge prevention layer.

* * * * *